Dec. 13, 1932.  B. JONES  1,891,162

GROUND SPEED INDICATOR

Filed July 7, 1930  2 Sheets-Sheet 1

INVENTOR
Bradley Jones.
BY
Robert H. Young
ATTORNEY

Dec. 13, 1932.                B. JONES                1,891,162
GROUND SPEED INDICATOR
Filed July 7, 1930          2 Sheets-Sheet 2
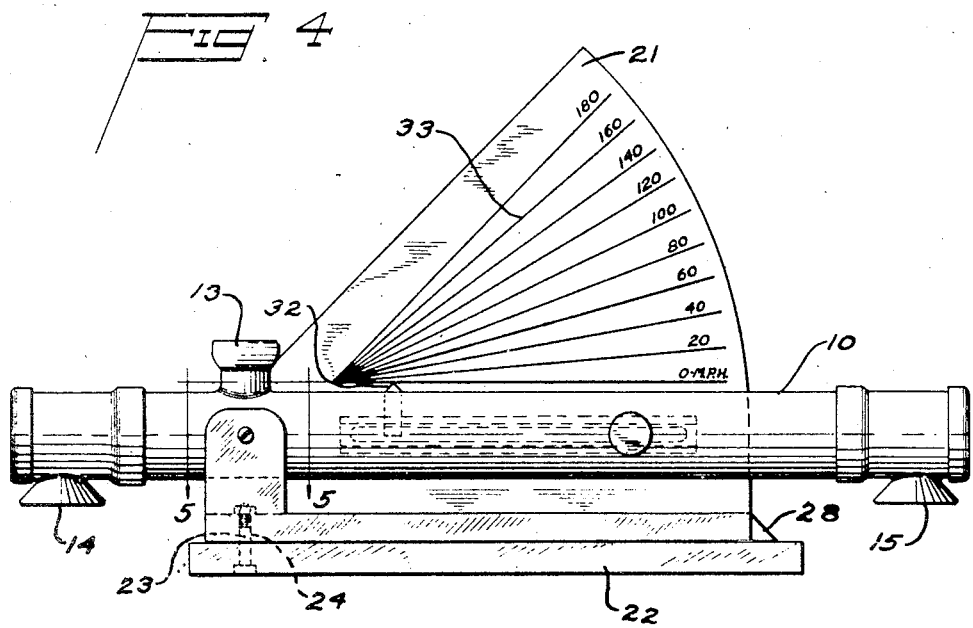
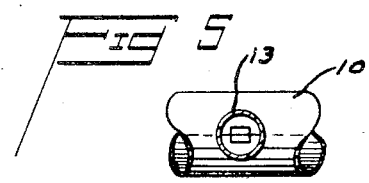
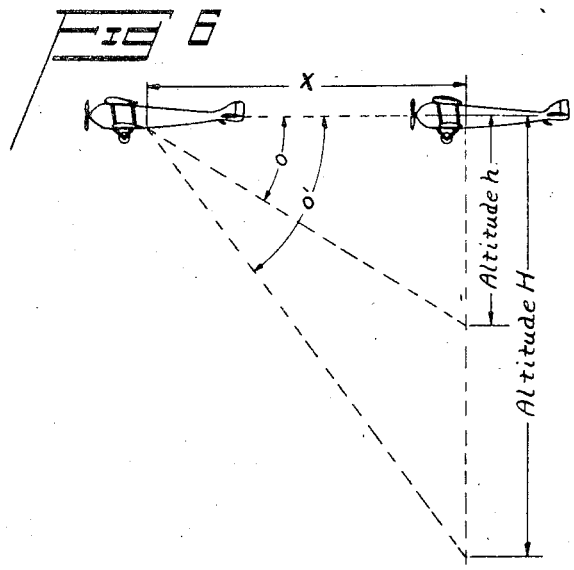
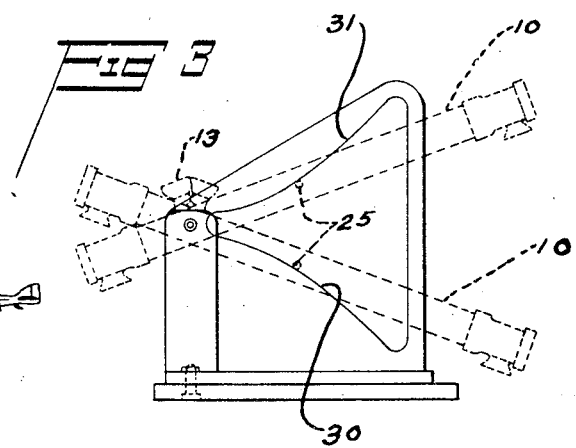
INVENTOR
Bradley Jones Patented Dec. 13, 1932

1,891,162

UNITED STATES PATENT OFFICE

BRADLEY JONES, OF CINCINNATI, OHIO

GROUND SPEED INDICATOR

Application filed July 7, 1930. Serial No. 466,337.

The present invention relates generally to ground speed indicators and more particularly to apparatus for use on a moving carrier such as an aircraft or the like wherein it is intended to make observations of objects on the ground through optical means in order to determine speed at which these ground objects are being passed over by the moving carrier.

It is a primary object of the present invention to provide means for determining the speed of a moving carrier such as an aircraft relative to the ground regardless of the speed or direction of the wind.

A further object of this invention is to provide in conjunction with said speed determining means, additional means for quickly determining the direction of an aircraft relative to the ground, for example, drift, in order that the aviator may have instant knowledge of the ground course he is actually flying and make the necessary corrections therefor.

In carrying my invention into practice, use is made of a range finder of conventional type which is moved at an angular velocity sufficient to keep an object on the ground in the line of sight of the range finder. Though in the description which follows a type of range finder will be described in which two halves of an image are brought into coincidence by means of an adjustable refracting prism, I do not desire that I shall limit myself to this particular type of range finder, as in all types some setting is made for altitude, the adjustment of the refracting prism in the present instance being an adjustment for altitude or some function of the altitude and used as a factor in determining ground speed.

According to the present invention the range finder is angularly movable about an axis between a so-called fixed stop and an adustable stop, the latter being adjustable in accordance with the altitude at which the aircraft is flying. By timing the movement of the range finder through any predetermined range of angular movement, which angular movement is determined by the position of the adjustable stop relative to the fixed stop, the speed of the aircraft may be timed. The distance traveled by the aircraft will in every case be the same, although the angle through which the range finder moves will vary with the altitude. The adustable stop which is connected to the refracting prism compensates for the altitude of the aircraft. The fixed stop in the present instance preferably comprises a generated cam surface representing any fixed distance of measurement such as one mile, two miles, or any other convenient distance setting.

The invention consists essentially in providing means for optically observing objects on the ground, means for moving one of the elements of said optical means to compensate for altitude, and means for determining the time lapse between a first and second sighting of an object on the ground by timing the angular movement of the range finder in sighting over a predetermined fixed course while following the apparent motion of the object sighted.

The invention also consists of means for observing and indicating the direction of the aircraft with respect to the ground. This is accomplished by mounting the range finder about a vertical and a horizontal axis relative to the aircraft so that the included angle between a vertical plane passing through the aircraft and the object sighted and the vertical plane passing the fore and aft axis of the aircraft shall be an indicated measure of drift.

From the aforementioned objects and purposes of the invention it will be apparent that by maintaining constant the distance traveled by the aircraft between the starting and stopping of the timing mechanism, ground speed may be simply and accurately determined.

My invention also consists in certain other features of construction and in the combination and arrangement of the several parts to be hereinafter fully, clearly, and concisely described and defined in the appended claims and illustrated in the accompanying drawings, wherein:

Fig. 3 is a modification of the construction shown in Fig. 1, which permits sighting of the object ahead of the aircraft.

Fig. 4 is a still further modification wherein ground speed may be directly read from the instrument.

Fig. 5 is a view showing in detail the appearance of the object sighted, wherein the two halves of the image have been brought into coincidence with one another.

Fig. 6 is a diagrammatic view disclosing the principle of operation.

Figure 1:
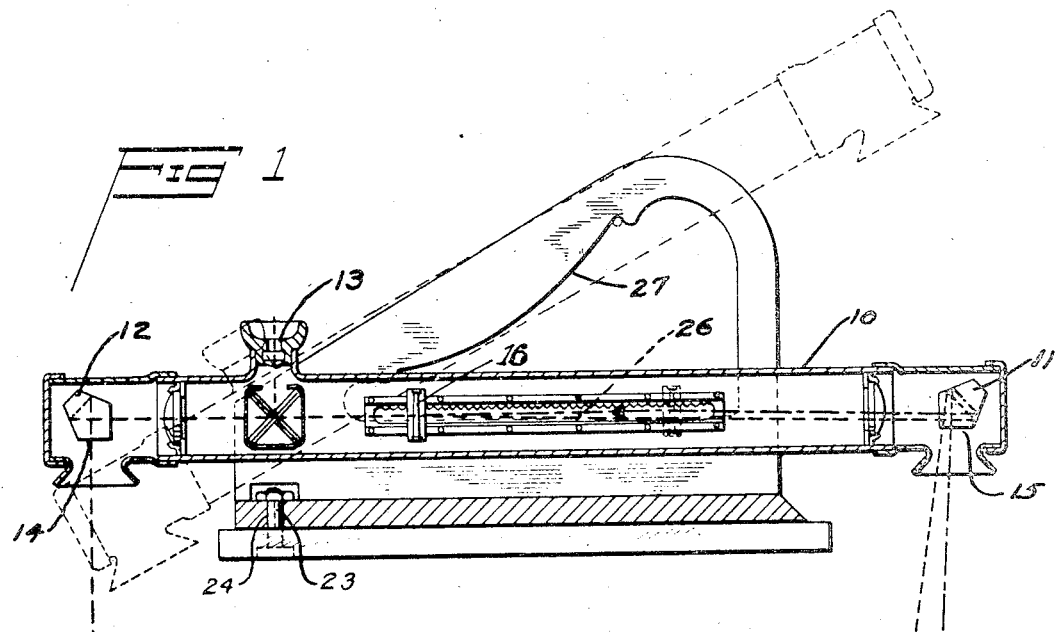
Fig. 1 is a sectional plan view of a ground speed indicator in accordance with my invention.

Referring more particularly to the drawings wherein corresponding parts are indicated by like numerals throughout the various views thereof, the instrument in the preferred embodiment of my invention herein illustrated comprising generally, an angularly movable sight directing, or object focusing means generally indicated by numeral 10. Any desired sight may be employed, wherein a setting is made for altitude, but I prefer the use of a range finder type of altimeter comprising two objective prisms 11 and 12 separated by a convenient distance which may be called the "base line" through which an object on the ground is sighted by the aid of a magnifying optical system including an eye piece 13 as shown in Fig. 1. In sighting through the range finder, if the exposed faces 14 and 15 of the objective prisms are in parallel alignment the object sighted will give rise to two images, each of which by means of the design of the optical system occupies only one half of the field of vision of the range finder. The two images are normally offset from one another, owing to the separation of the two objective prisms. The optical sight of the range finder also includes a refracting prism 16 which is adjustably mounted within the line of vision of the one objective prism whereby shifting of the same in the field of vision brings the two images of an object into coincidence with one another as shown in detail Fig. 5. The movement of the refracting prism is proportional to the altitude and a pointer 17 operating over a scale 18 provided on range finder, indicated directly the altitude at which the aircraft is flying when once the images of the object sighted are brought into coincidence. The foregoing is for the most part by way of explanation of what follows and is descriptive in a general way of one form of range finder adapted for altitude computation.

The range finder 10 is conveniently provided with trunnions 19, which are rotatably mounted in bearings 20 provided in the supporting member 21, the latter being pivotally mounted about a vertical axis and carried by a base member 22 which may be fixedly secured to the aircraft. A stud 23 is secured to the base member at one end thereof and at right angles to the base member as shown in Fig. 1 to provide a bearing surface for the bearing 24 provided in the supporting member heretofore mentioned.

The refracting prism is provided with a stud 25 which projects outwardly from the casing of the range finder and which normally rests on the horizontal surface 26 provided in the supporting member 21. The supporting member is also formed with a developed cam surface 27, as shown in Fig. 1, which lies within the plane of movement of the stud 25. This cam surface may be developed to represent any desired fixed distance of travel of the aircraft over the ground, such as one, two, or five miles, or any other convenient distance. In the cam herein shown a cam surface developed for a one-mile course is illustrative of the invention.

Means for indicating the drift of the aircraft over the ground is also provided in the instrument. In the present illustrative case, the supporting member 21 is provided with a pointer arm 28 adapted to cooperate with the scale 29, provided on the base member 22. This scale bears calibrations in degrees of drift reading from left to right respectively of its zero setting, which latter is conveniently located upon, or in parallel alignment with the fore and aft axis of the aircraft.

The operation of the instrument is as follows; the altitude of the aircraft is determined by sighting upon an object on the ground and the refracting prism 16 is adjusted to bring the two images of the object sighted into coincidence. The adjustment of the refracting prism also adjusts the position of the stud 25 which forms the adjustable stop heretofore mentioned, relative to the cam surface 27, the latter being the fixed stop referred to hereinbefore. The altitude of the aircraft having once been determined, which same effects a setting of the stud 25, an object upon the ground is sighted through the range finder. When the first sighting of the object is made the range finder will be in the horizontal position indicated in full line in Fig. 1 and shown diagrammatically in Fig. 6 of the drawings. At this instant a timing mechanism such as a stop watch or the like is started. Sighting upon the object continues until such time as the stud 25 brings up against the cam surface 27, the range finder having swung through an angle $o$ if the aircraft is flying at the height $h$ above the ground and through angle $o'$ if the aircraft is flying at the height $H$ above the ground to occupy, substantially, the dotted line position shown in Fig. 1. At the instant the stud 25 contacts with the cam surface 27, the timing mechanism is stopped and the indicated time will be a measure of the time which it has taken the aircraft to travel over the predetermined fixed distance of measurement.

In Fig. 6 it is diagrammatically illustrated that the distance $x$ over which the aircraft travels between the starting and stopping of the timing mechanism is the same irrespective of the altitude at which the aircraft is flying. Since the distance traveled by the aircraft is the same in all cases, it will be apparent that ground speed may be determined by dividing the distance by the time indicated on the timing mechanism, or if desired, the timing mechanism may be constructed to read directly in miles per hour. Since correction is made for altitude by the setting of the range finder and the time is known, ground speed can be readily determined as above described.

In Fig. 3 is shown a modified form of the invention wherein the cam surface 27 heretofore mentioned, is symmetrical about the axis of rotation of the range finder. This permits the sighting of the range finder to be made on the object ahead of the aircraft, the stud 25 resting on the lower surface 30, which is so shaped that when the range finder is adjusted for height the object will be forward of the aircraft a distance $$\frac{x}{2},$$

one half the time interval, and wherein the stud 25 brings up against the upper surface 31 of the cam 27 when the object is sighted at a distance $$\frac{x}{2}$$

to the rear of the aircraft. In this modification the two halves of the image being in coincidence at the beginning of the timing period, will depart from coincidence while the object is being followed and return to coincidence at the end of the timing period, in example, when the image appears in the center of the field of vision of the range finder and in coincidence with the other image and with the stud 25 contacting with the upper surface 31 of the cam.

Figure 2:
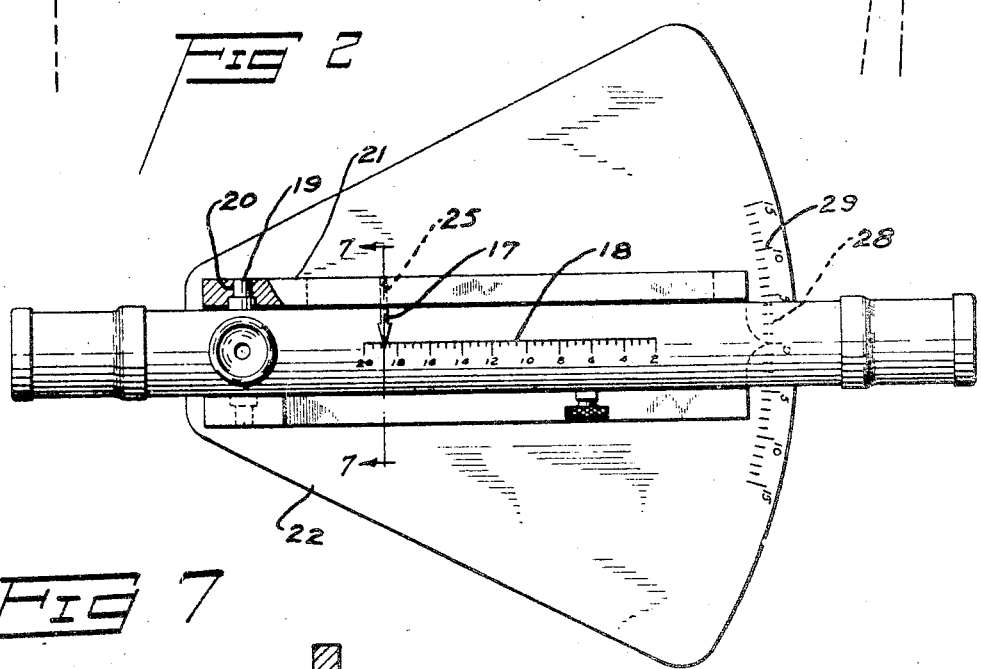
Fig. 2 is a plan view of Fig. 1.
Figure 7:
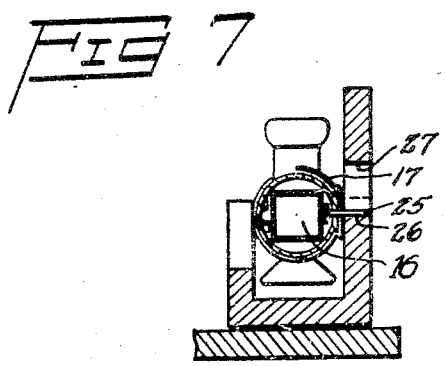
Fig. 7 is a sectional view taken on the line 7—7 of Fig. 2.

In any other case then when there is zero drift, in order to follow the motion of the object sighted as it moves to the right or left of the fore and aft of the aircraft, the range finder in its supporting member 21 rotates on the base 22 about its pivot 23 and the angle of drift is indicated by the pointer 28 moving over the scale 29 on the base member as shown in Fig. 2.

Fig. 4 shows a further modification of the invention wherein the range finder is moved for a given time, in example, one minute or two minutes. In this case the refracting prism is provided with a pointer 32, which moves over a scale 33, provided on the supporting member 21, the scale being calibrated to read directly the speed in miles per hour of the aircraft.

From the foregoing description of the construction of my invention it will be seen that I have provided simple yet inexpensive and efficient means for carrying out the several objects of my invention and while I have particularly described the preferred embodiment of my invention best adapted to perform the function set forth it is obvious that various changes in form and proportion and in the minor details of construction may be had without departing from the spirit of the invention.

What I therefore claim as new and desire to procure by Letters Patent is:

1. A ground speed indicator for a moving body comprising a range finder having altitude determining means, a supporting member therefor having a generated cam surface representing a fixed distance of travel upon the ground, and means carrying said altitude determining means and cooperating with said cam surface for governing the angular movement of said range finder in computing ground speed.

2. A ground speed indicator for a moving body comprising a range finder having altitude determining means, a supporting member therefor having a generated cam surface representing a fixed distance of travel upon the ground, and means carrying said altitude determining means forming a stop element adapted to abut against said cam surface at varying points for predeterminately controlling the extent of angular movement of said range finder in computing ground speed.

3. A ground speed indicator for aircraft comprising a supporting member having a generated cam surface, a range finder pivotally mounted for angular movement relative to said cam surface and having altitude determining means provided thereon and a stop carried by said altitude determining means cooperating with said cam surface and adjustable relative to the pivotal mounting of said range finder, whereby the ground speed of said aircraft may be determined by timing the angular movement of said range finder in sighting upon a fixed object upon the ground.

4. In a ground speed indicator for a moving body, a range finder having altitude determining means, a supporting member therefor, having a generated cam surface representing a fixed distance of travel of said aircraft upon the ground, a means carried by said altitude determining means and cooperating with said cam surface to govern the angular movement of said range finder in computing ground speed, and a means cooperating with said supporting member for indicating the drift of said moving body over the ground.

5. In a ground speed indicator for a moving body, a range finder having altitude determining means, a supporting member therefor, having a generated cam surface representing a fixed distance of travel of said aircraft upon the ground, a means carried by said altitude determining means and cooperating with said cam surface to govern the angular movement of said range finder in computing ground speed, and a means cooperating with said supporting member for indicating the drift of said moving body over the ground, said means comprising a scale, a pointer carried by said supporting member and adaptable for movement over said scale.

6. In a ground speed indicator for a moving body, a range finder having altitude determining means, a base member, a supporting member for said range finder pivotally mounted about a horizontal axis on said base member, said supporting member having a generated cam surface representing a fixed distance of travel upon the ground, means carried by said altitude determining means and cooperating with said cam surface for governing the angular movement of said range finder in computing ground speed, and means cooperating with said supporting member for indicating the drift of said moving body, said means comprising a scale on said base member and a pointer carried by said supporting member adapted for movement over said scale.

7. A ground speed indicator for aircraft comprising a supporting member having a cam surface and a range finder including altitude determining means pivotally mounted for angular movement on said supporting member, and a stop pin associated with said altitude determining means and adjustable toward and away from said cam surface in adjusting for altitude for governing the extent of angular movement of said range finder so constructed and arranged that the ground speed of said aircraft may be determined by timing said angular movement.

8. A ground speed indicator for aircraft comprising a supporting member having ground speed indicating scale provided thereon, a range finder including altitude determining means pivotally mounted for angular movement on said supporting member, and a pointer carried by said altitude determining means and movable over said indicating scale upon angular adjustment of said range finder for a predetermined period of time to indicate directly the ground speed of said aircraft.

9. A ground speed indicator for aircraft comprising a supporting member having a generated cam surface representing a fixed distance of travel of said aircraft over the ground, a range finder including altitude determining means pivotally mounted for angular movement on said supporting member and a stop operatively connected with said altitude determining means, said stop being adjustable relative to said cam surface in adjusting for altitude, the position of which controls the angular movement of said range finder in determining ground speed.

In testimony whereof I affix my signature.

BRADLEY JONES.